Patented Aug. 13, 1929.

1,724,305

UNITED STATES PATENT OFFICE.

IWAN OSTROMISLENSKY, OF NEW YORK, N. Y., ASSIGNOR TO THE PYRIDIUM CORPORATION, OF NEW YORK, N. Y., A CORPORATION OF NEW YORK.

METHOD OF OBTAINING PYRIDIUM.

No Drawing. Application filed September 23, 1927. Serial No. 221,628.

This invention is an improvement in methods of preparing water soluble azo dyes, and more particularly in methods of obtaining phenyl-diazo-amido-(alpha)-alpha-monamino pyridine, and the hydrochlorides thereof.

One of the primary objects of the present invention is the provision of a method of preparing a substance which for convenience is designated py-diazo-amino compound, capable of direct conversion into phenyl-azo-alpha-diamino-pyridine.

When phenyl-diazonium salts are coupled with alpha-alpha-diaminopyridines, under certain conditions, phenyl-diazo-amido-(alpha)-alpha-monamino pyridine, which for the sake of brevity is hereafter designated py-diazo-amido compound, is obtained. This result is obtained not only when coupling is performed in an aqueous medium acidified with organic acid, such as acetic acid, but likewise when an insufficient amount of mineral acid, such as hydrochloric acid, is used.

The compound appears in fine, prismatic, yellowish-brown crystals, and dissolves very easily in aniline and in pyridine. Recrystallized from carbon tetra-chloride, it appears in the form of fine light orange red lamellæ with a silky shine. The formula is as follows:—

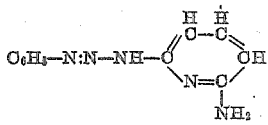

The compound is easily converted in reaction with hydrochloric acid to the hydrochloride, which is very dark in color, and takes on a deep violet tint when dissolved in concentrated hydrochloric acid. The hydrochloride decomposes readily not only under the action of water, and even from humidity in the air, but also in a very weak hydrochloric acid.

The most striking feature of the hydrochlorides of the py-diazoamido compound is the excessive facility with which they are converted to the corresponding azo-amido compound, that is, phenyl-azo-alpha-alpha-diamino-pyridine. For this purpose it is sufficient to boil the given hydrochloride with pure distilled water for from 5 to 120 minutes. In this time the original hydrochloride dissolves in water and is quantitatively converted into phenyl-azo-diaminopyridine hydrochlorides, or the corresponding azo-amido compound, in accordance with the following formula:—

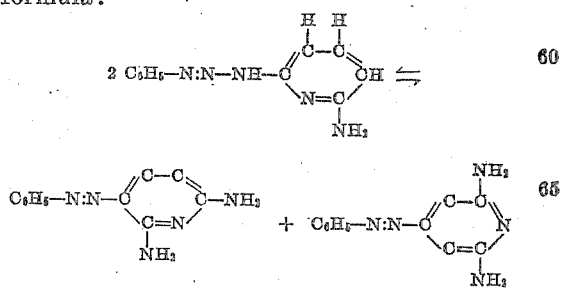

This enables the obtaining of the chemically pure phenyl-azo-alpha-alpha-diamino-pyridine hydrochloride without losses.

When one gram of phenyldiazoaminomonoaminopyridine is boiled with 100 cc. of distilled water, the substance gradually goes into solution, and is simultaneously converted into pure phenyl azo diamino pyridine, with a melting point of 137° C.

When boiled with aniline the hydrochlorides of the diazo-amido compounds are transformed, quantitatively, to the corresponding azo-amido compound.

Analogous diazo compounds are easily obtained under the same conditions by coupling alpha-alpha-diamino-pyridine with the diazotized homologues and analogues of aniline, such as diazotized toluidines, phenetidine, anisidine, and the like. Analogous with the first and simplest member of the homologue series, the hydrochlorides of all these salts of diazo-amido compounds are easily converted to the corresponding azo-amido compounds under similar conditions, for example, prolonged boiling of the substances in distilled water, aniline, or the like. The base and its hydrochlorides occur in fine crystals in different shades of brown and yellow-brown, or reddish orange.

The phenyl-diazo-amido-(alpha)-alpha-mono-amino-pyridine compound described above is interesting, from the view point of a method of obtaining phenyl-azo-alpha-alpha-diamino-pyridine hydrochlorides by boiling water. When ingested by the mouth, it is quickly and easily converted to phenyl-azo-alpha - alpha - diamino - pyridine hydrochlorides by the action of the stomach juices, and the presence of its decomposition products in the patient's urine, may be easily proven some five to six hours after the ingestion.

What is claimed as new is:

1. As an article of manufacture a phenyl-diazo-amino-alpha-monamino-pyridine compound comprising in its structure the following grouping:—

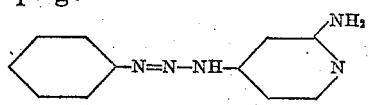

2. As an article of manufacture a phenyl-diazo-amino-alpha-monamino-pyridine compound comprising in its structure the following probable grouping:—

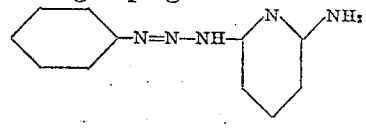

and which may occur in the form of a free base or in the form of a salt, and which has in the form of the free base a melting point of 117° C.

3. The method of obtaining phenyl-diazo-amino-alpha-monoamino pyridine hydrochloride (py-diazo-amino compound), which consists in reacting phenyl-diazonium-salts with alpha-alpha-diamino pyridines in a weakly acidified aqueous medium.

Signed at New York in the county of New York and State of New York this 20th day of Sept. A. D. 1927.

IWAN OSTROMISLENSKY.